(12) United States Patent
Zamirpour

(10) Patent No.: US 9,526,208 B2
(45) Date of Patent: Dec. 27, 2016

(54) TREE MOUNTED TARP DEVICE

(71) Applicant: Payman Zamirpour, Baytown, TX (US)

(72) Inventor: Payman Zamirpour, Baytown, TX (US)

( * ) Notice: Subject to any disclaimer, the term of this patent is extended or adjusted under 35 U.S.C. 154(b) by 0 days.

(21) Appl. No.: 14/640,094

(22) Filed: Mar. 6, 2015

(65) Prior Publication Data

US 2016/0255772 A1  Sep. 8, 2016

(51) Int. Cl.
*A01D 46/24* (2006.01)
*A01D 46/26* (2006.01)

(52) U.S. Cl.
CPC ......... *A01D 46/26* (2013.01); *A01D 2046/262* (2013.01)

(58) Field of Classification Search
CPC ........ A01D 46/22; A01D 46/00; A01D 46/24; A01D 2046/262
USPC ....... 56/328.1, 329, 340.1; D8/1; 135/90, 87
See application file for complete search history.

(56) References Cited

U.S. PATENT DOCUMENTS

| | | | | |
|---|---|---|---|---|
| 5,156 A | * | 6/1847 | Collyer | A01D 46/26 43/133 |
| 66,807 A | * | 7/1867 | Darling | A01D 46/26 56/329 |
| 794,150 A | * | 7/1905 | Hertz | A01D 46/26 56/329 |
| 1,286,947 A | * | 12/1918 | Creed | A01D 46/26 56/329 |
| 1,366,563 A | * | 1/1921 | Fleckner | A01D 46/26 56/329 |
| 2,509,569 A | * | 5/1950 | Langford | A01D 46/26 56/329 |
| 2,649,680 A | * | 8/1953 | Brown | A01D 46/26 43/108 |
| 4,505,286 A | | 3/1985 | Madion | |
| 4,739,785 A | | 4/1988 | Poulson | |
| 4,836,232 A | | 6/1989 | De Rosa et al. | |
| 4,901,513 A | | 2/1990 | Kim et al. | |
| 5,538,523 A | | 7/1996 | Benetti | |
| 5,744,212 A | * | 4/1998 | Meeks | A01G 13/0281 428/131 |
| 5,787,914 A | | 8/1998 | Greywall | |
| 5,848,522 A | * | 12/1998 | Coviello, Jr. | A01D 46/26 47/32.4 |
| D461,429 S | | 8/2002 | Holland | |
| 7,264,011 B2 | | 9/2007 | Cohen | |
| 7,290,552 B1 | | 11/2007 | Eisbrenner | |
| D604,428 S | | 11/2009 | Waters | |

(Continued)

FOREIGN PATENT DOCUMENTS

CH  136853  *  2/1930

*Primary Examiner* — John G Weiss

(57) ABSTRACT

A tree mounted tarp device couples a tarp to a tree under branches of the tree. The device includes a plurality of panels pivotally coupled together such that the panels are formable into a closed loop wrapping around a trunk of a tree. Each of a plurality of hooks is coupled to and extends from a top end of an associated one of the panels. Each of the hooks is directed towards a center of the closed loop for engaging the trunk of the tree facilitating suspension of the panels at a fixed height on the trunk of the tree. A tarp is coupled to the panels by a frame coupled to the panels. The frame supports the tarp in a deployed position wherein the tarp extends outwardly relative to the panels such that the tarp extends around the trunk of the tree under branches of the tree.

5 Claims, 5 Drawing Sheets

(56) References Cited

U.S. PATENT DOCUMENTS 9,051,753 B1 * 6/2015 Zamirpour .............. E04H 15/04

* cited by examiner

TREE MOUNTED TARP DEVICE

BACKGROUND OF THE DISCLOSURE

Field of the Disclosure

The disclosure relates to tarp devices and more particularly pertains to a new tarp device for coupling a tarp to a tree under branches to alternatively protect objects under the branches from debris falling from the branches and facilitate collection of items harvested from the branches of the tree.

SUMMARY OF THE DISCLOSURE

An embodiment of the disclosure meets the needs presented above by generally comprising a plurality of panels pivotally coupled together such that the panels are formable into a closed loop wrapping around a trunk of a tree. Each of a plurality of hooks is coupled to and extends from a top end of an associated one of the panels. Each of the hooks is directed towards a center of the closed loop for engaging the trunk of the tree facilitating suspension of the panels at a fixed height on the trunk of the tree. A tarp is coupled to the panels by a frame coupled to the panels. The frame supports the tarp in a deployed position wherein the tarp extends outwardly relative to the panels such that the tarp extends around the trunk of the tree under branches of the tree.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
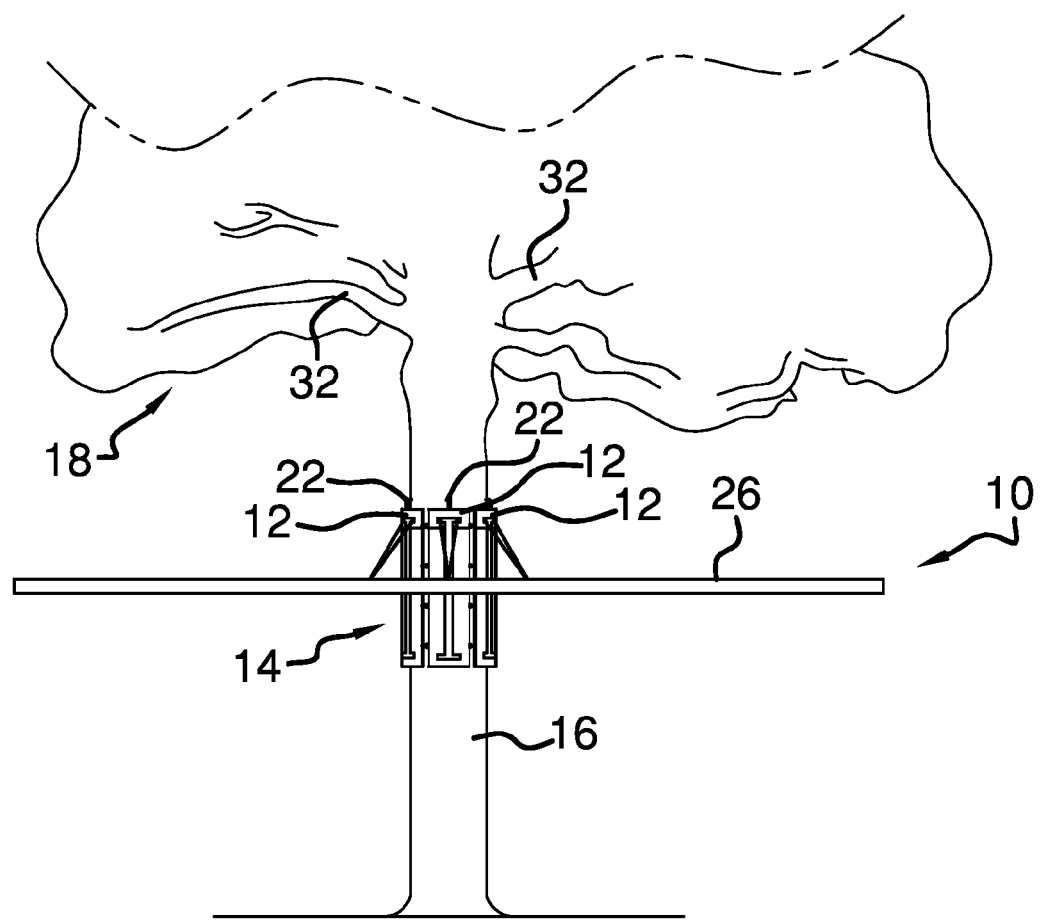
FIG. 1 is a front view of a tree mounted tarp device according to an embodiment of the disclosure.

With reference now to the drawings, and in particular to FIGS. 1 through 8 thereof, a new tarp device embodying the principles and concepts of an embodiment of the disclosure and generally designated by the reference numeral 10 will be described.

Figure 2:
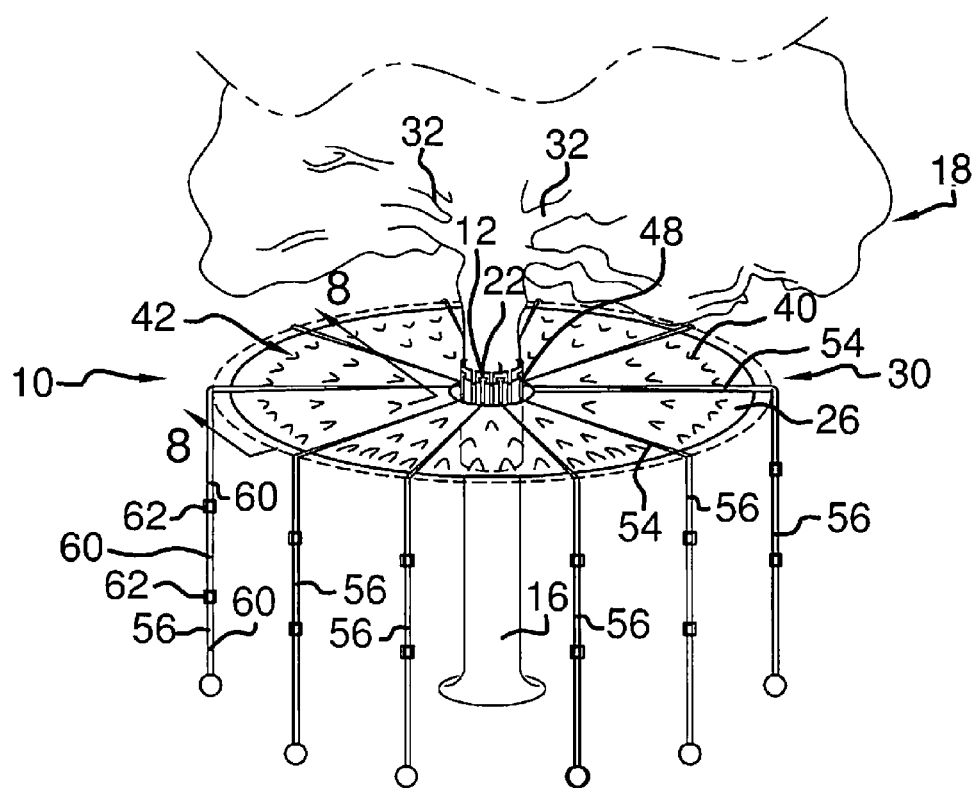
FIG. 2 is a top front perspective view of another embodiment of the disclosure.
Figure 3:
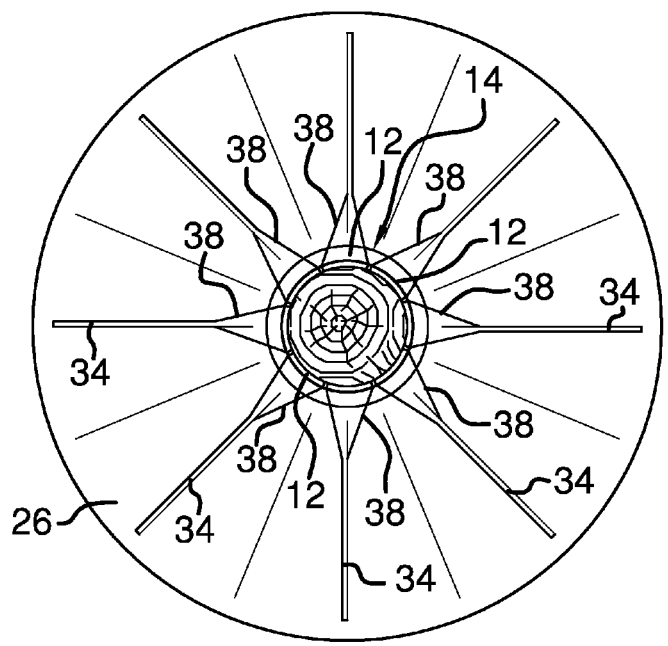
FIG. 3 is a top view of an embodiment of the disclosure.
Figure 4:
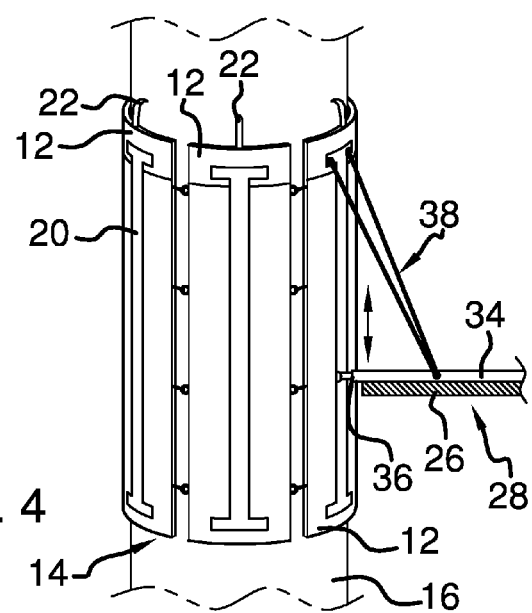
FIG. 4 is a partial detailed front side perspective view of an embodiment of the disclosure.
Figure 5:
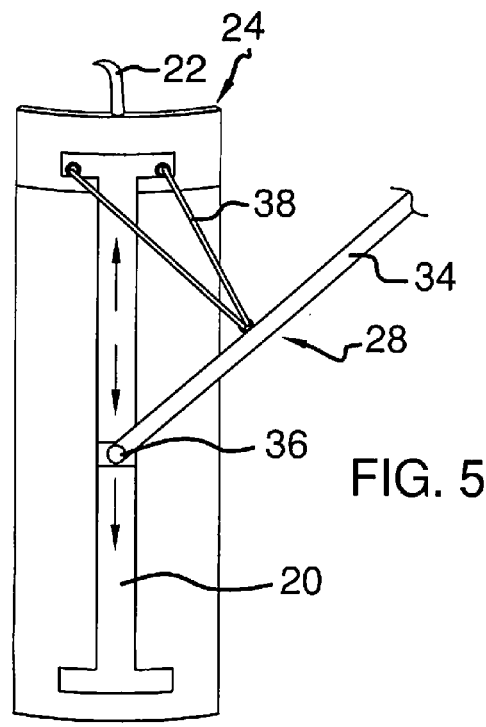
FIG. 5 is a detailed front view of an embodiment of the disclosure.
Figure 8:
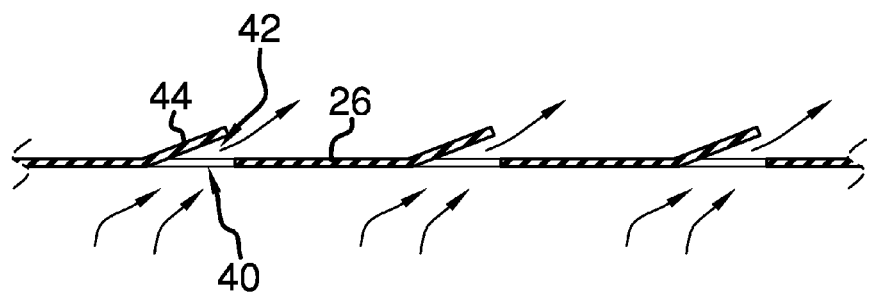
FIG. 8 is a cross-sectional view of an embodiment of the disclosure taken along line 8-8 of FIG. 2.

As best illustrated generally in FIGS. 1 and 2, the tree mounted tarp device 10 generally comprises a plurality of panels 12. The panels 12 are pivotally or flexibly coupled together such that the panels 12 are formable into a closed loop 14. The panels 12 are configured for wrapping around a trunk 16 of a tree 18. Each of the panels 12 is elongated and rectangular. The panels 12 may be removably coupled together in a conventional manner allowing for addition or subtraction of panels 12 such that the closed loop 14 is adjustable to a desired size to fit the trunk 16 of the tree 18. A tarp 26 is coupled to the panels 12. A frame 28 is coupled to the panels 12. The frame 28 supports the tarp 26 in a deployed position 30 wherein the tarp 26 extends outwardly relative to the panels 12 such that the tarp 26 is configured to extend around the trunk 16 of the tree 18 under branches 32 of the tree 18. In each of the embodiments described below, as shown in FIGS. 2 and 8, each of a plurality of vents 40 may extend through the tarp 26. Each vent 40 is defined by a curved slit 42 extending through the tarp 26 such that each curved slit 42 defines an associated flap 44.

In an embodiment shown in FIGS. 1 and 3 through 5, each panel 12 is structured to include a respective longitudinal slot 20. Each longitudinal slot 20 is vertically oriented when the panels 12 are formed into the closed loop 14. Each of a plurality of hooks 22 is coupled to and extends from a top end 24 of an associated one of the panels 12. Each of the hooks 22 is directed towards a center of the closed loop 14 wherein each of the hooks 22 is configured for engaging the trunk 16 of the tree 18 facilitating suspension of the panels 12 at a fixed height on the trunk 16 of the tree 18. The frame 28 in the embodiment shown in FIGS. 1 and 3 through 5 comprises a plurality of ribs 34. Each rib 34 is mechanically coupled to an associated one of the panels 12 such that each rib 34 is selectively extendable and retractable relative to the closed loop 14. The tarp 26 is coupled to the ribs 34 wherein the tarp 26 is urged into the deployed position 30 when the ribs 34 are extended. Each rib 34 has a first end 36 slidably positioned in an associated one of the slots 20. Each of a plurality of braces 38 is pivotally coupled to an associated one of the ribs 34 and an associated one of the slots 20 wherein the tarp 26 is movable into the deployed position 30 by sliding of the braces 38 in the slots 20. The ribs 34 may be jointed and extend mechanically in similar fashion to a conventional umbrella structure.

Figure 6:
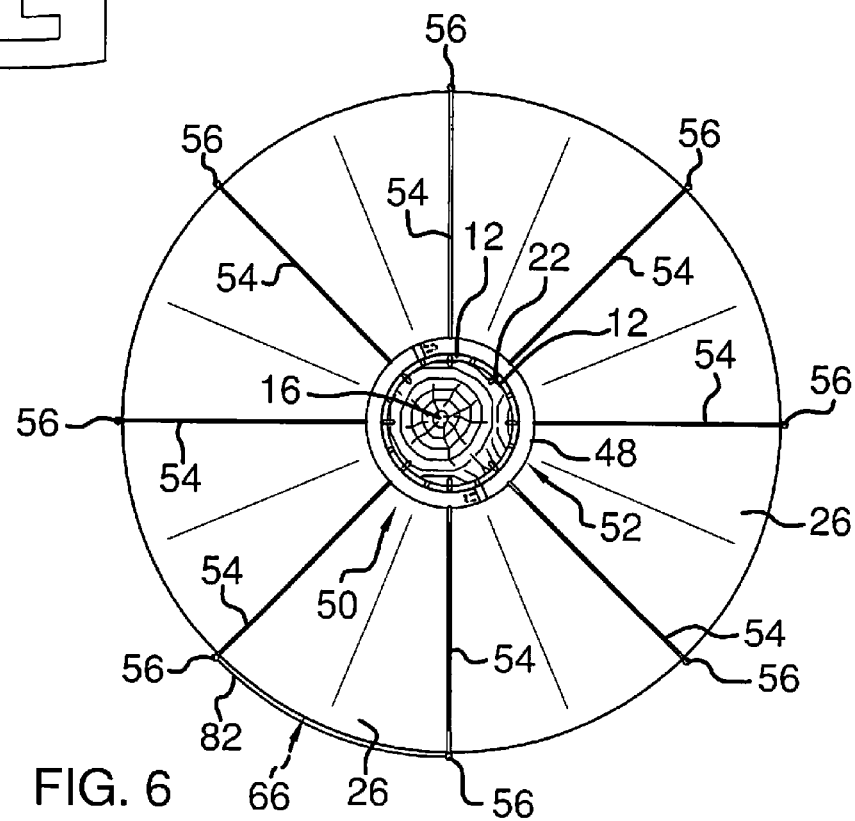
FIG. 6 is a top view of an embodiment of the disclosure.
Figure 7:
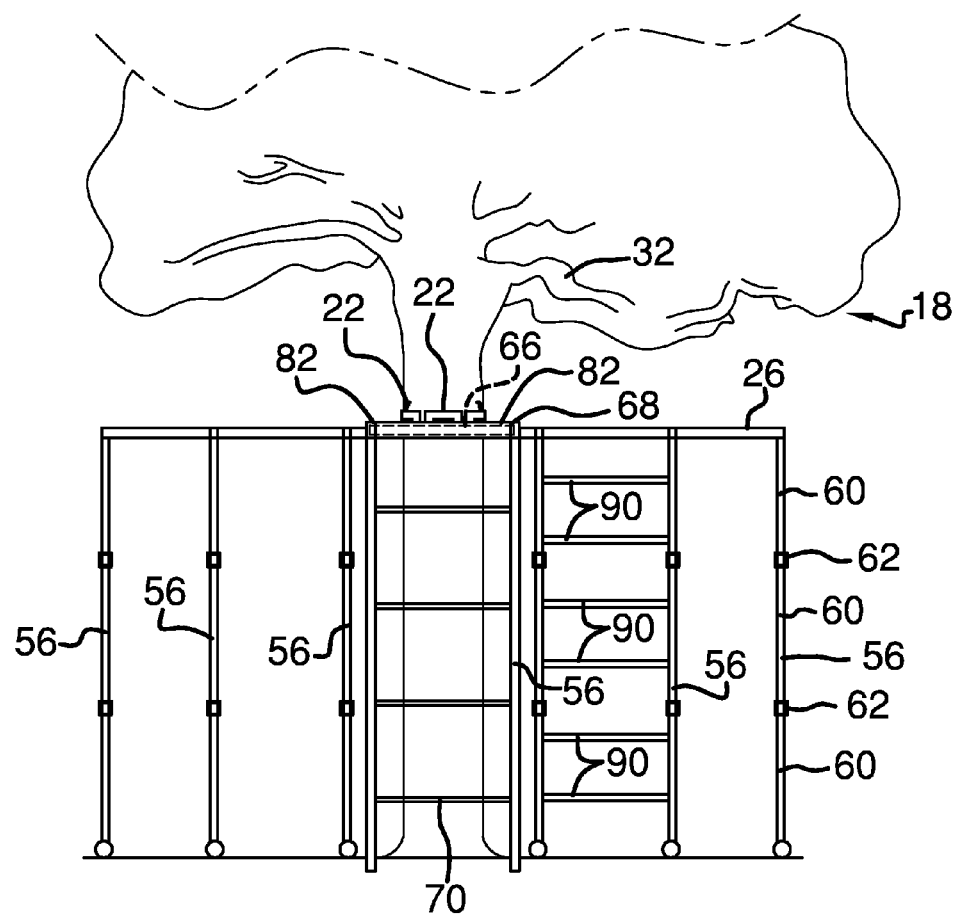
FIG. 7 is a front view of an embodiment of the disclosure.

In an embodiment shown in FIGS. 2, 6 and 7, a ring 48 is coupled to the closed loop 14 in a conventional manner. The ring 48 extends concentrically around the closed loop 14. The ring 48 has a first section 50 coupled to a second section 52. The first section 50 is selectively disengageable from the second section 52 to open the ring 48 wherein the ring 48 is configured for facilitating positioning of the ring 48 around the trunk 16 of the tree 18. The frame 28 comprises a plurality of rods 54. Each rod 54 is coupled to and extends from the ring 48. Each rod 54 may be slidable on the respective one of the first section 50 and the second section 52 to which each rod 54 is attached allowing the rods to be gathered together for storage. The tarp 26 is coupled to each of the rods 54. Each of a plurality of legs 56 is coupled to and extends from an associated one of the rods 54 at a distal end 58 of the respective rod 54 relative to the panels 12. Each leg 56 may be telescopic having nested sections 60 and compression collars 62 or the like to secure each leg 56 at a desired length. There may be a total of six to eight legs 56 provided and radially arranged around the ring 48. Each leg 56 is positionable to support the associated rod 54 in an extended position from the ring 48 such that the tarp 26 is positionable in the deployed position 30.

In the embodiment shown in FIGS. 2, 6 and 7, a sleeve 82 may be coupled to the tarp 26 along an outer edge 64 of the tarp 26 between adjacently positioned legs 56. A bar 66 is insertable through the sleeve 82 wherein the bar 66 is coupled to the outer edge 64 of the tarp 26. A top end 68 of a ladder 70 is supportable by the bar 66 wherein the ladder 70 is configured for supporting a person to facilitate reaching of the branches 32 of the tree 18 over the tarp 26 when the tarp 26 is in the deployed position 30. Alternatively, as also shown in FIG. 7, supplemental bars 90 may be coupled to the adjacently positioned legs 56 in a conventional manner. The supplemental bars 90 are positioned in spaced parallel relationship to each other such that the supplemental bars 90 may be stepped upon like rungs on the ladder 70.

In use, the panels 12 are coupled to the trunk 16 of the tree 18 at a desired height. The frame 28 according to each of the above embodiments, is manipulated to extend the tarp 26 beneath the branches 32 of the tree 18. The tarp 26 is positioned to catch items such as sap, leaves, fruit, nuts, or the like, falling from the branches 32 of the tree 18. Thus, the device 10 may be used alternatively for collection of items removed from the branches 32 of the tree 18 or as a shield to prevent damage or defacing of an object under the tarp 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tree mounted tarp device comprising:
  a plurality of panels, said panels being pivotally coupled together such that said panels are formable into a closed loop wherein said panels are configured for wrapping around a trunk of a tree;
  a plurality of hooks, each of said hooks being coupled to and extending from a top end of an associated one of said panels, each of said hooks being directed towards a center of said closed loop wherein each of said hooks is configured for engaging the trunk of the tree facilitating suspension of said panels at a fixed height on the trunk of the tree;
  a tarp coupled to said panels;
  a ring coupled to said closed loop, said ring extending around said closed loop;
  a frame coupled to said panels, said frame supporting said tarp in a deployed position wherein said tarp extends outwardly relative to said panels such that said tarp is configured to extend around the trunk of the tree under branches of the tree, said frame comprising
    a plurality of rods, each said rod being coupled to and extending from said ring, and
    a plurality of legs, each said leg being coupled to and extending from an associated one of said rods wherein each said leg is positionable to support said associated rod in an extended position from said ring such that said tarp is positionable in said deployed position;
  a sleeve coupled to said tarp, said sleeve being positioned along an outer edge of said tarp between adjacently positioned said legs;
  a bar, said bar being insertable through said sleeve wherein said bar is coupled to said outer edge of said tarp; and
  a ladder, a top end of said ladder being supportable by said bar wherein said ladder is configured for supporting a person to facilitate reaching of the branches of the tree over said tarp when said tarp is in the deployed position.

2. The device of claim 1, further comprising said ring having a first section coupled to a second section, said first section being selectively disengageable from said first section to open said ring wherein said ring is configured for facilitating positioning of said ring around the trunk of the tree.

3. The device of claim 1, further comprising a plurality of vents extending through said tarp.

4. The assembly of claim 3, further comprising each said vent being defined by a curved slit extending through said tarp, each curved slit defining an associated flap.

5. A tree mounted tarp device comprising:
  a plurality of panels, said panels being pivotally coupled together such that said panels are formable into a closed loop wherein said panels are configured for wrapping a trunk of a tree;
  a plurality of hooks, each of said hooks being coupled to and extending from a top end of an associated one of said panels, each of said hooks being directed towards a center of said closed loop wherein each of said hooks is configured for engaging the trunk of the tree facilitating suspension of said panels at a fixed height on the trunk of the tree;
  a tarp coupled to said panels;
  a frame coupled to said panels, said frame supporting said tarp in a deployed position wherein said tarp extends outwardly relative to said panels such that said tarp is configured to extend around the trunk of the tree under branches of the tree, said frame comprising
    a plurality of rods, and
    a plurality of legs, each said leg being coupled to and extending from an associated one of said rods wherein each said leg is positionable to support said associated rod in an extended position from said ring such that said tarp is positionable in said deployed position;
  a ring coupled to said closed loop, each said rod being coupled to and extending from said ring, said ring extending around said closed loop, said ring having a first section coupled to a second section, said first section being selectively disengageable from said first section to open said ring wherein said ring is configured for facilitating positioning of said ring around the trunk of the tree;

a sleeve coupled to said tarp, said sleeve being positioned along an outer edge of said tarp between adjacently positioned said legs;
a bar, said bar being insertable through said sleeve wherein said bar is coupled to said outer edge of said tarp;
a ladder, a top end of said ladder being supportable by said bar wherein said ladder is configured for supporting a person to facilitate reaching of the branches of the tree over said tarp when said tarp is in the deployed position; and
a plurality of vents extending through said tarp, each said vent being defined by a curved slit extending through said tarp, each curved slit defining an associated flap.

* * * * *